US012397314B2

(12) United States Patent
Iwasa et al.

(10) Patent No.: US 12,397,314 B2
(45) Date of Patent: Aug. 26, 2025

(54) PAINTING METHOD AND PAINTING APPARATUS FOR BAND MATERIAL

(71) Applicant: DAIWA CAN COMPANY, Chiyoda-ku (JP)

(72) Inventors: Miki Iwasa, Sagamihara (JP); Nobuyasu Seki, Sagamihara (JP); Chikako Miyagawa, Sagamihara (JP); Kenji Kawahara, Sagamihara (JP); Yasushi Enoki, Sagamihara (JP)

(73) Assignee: DAIWA CAN COMPANY, Chiyoda-ku (JP)

( * ) Notice: Subject to any disclaimer, the term of this patent is extended or adjusted under 35 U.S.C. 154(b) by 169 days.

(21) Appl. No.: 17/785,812

(22) PCT Filed: Nov. 4, 2020

(86) PCT No.: PCT/JP2020/041176

§ 371 (c)(1),
(2) Date: Jun. 15, 2022

(87) PCT Pub. No.: WO2021/124714

PCT Pub. Date: Jun. 24, 2021

(65) Prior Publication Data

US 2023/0060382 A1 Mar. 2, 2023

(30) Foreign Application Priority Data

Dec. 17, 2019 (JP) ................................ 2019-227198

(51) Int. Cl.
*B05D 1/28* (2006.01)
*B05C 1/08* (2006.01)
(Continued)

(52) U.S. Cl.
CPC ............ *B05C 1/0813* (2013.01); *B05C 13/02* (2013.01); *B05D 1/28* (2013.01); *B05C 11/10* (2013.01);
(Continued)

(58) Field of Classification Search
CPC ... B05D 1/28; B05D 7/00; B05D 7/24; B05D 2252/02; B05C 1/08; B05C 1/0813; B05C 11/10
(Continued)

(56) References Cited

U.S. PATENT DOCUMENTS 618,788 A * 1/1899 Davis ....................... B05D 1/20 427/430.1
2,661,310 A * 12/1953 Page .................. B05B 13/0457 118/316
(Continued)

FOREIGN PATENT DOCUMENTS

CN 105142926 A 12/2015
JP 62160161 A * 7/1987
(Continued)

OTHER PUBLICATIONS

International Search Report mailed on Jan. 19, 2021 in PCT/JP2020/041176 filed on Nov. 4, 2020 (3 pages).

*Primary Examiner* — Brian K Talbot
(74) *Attorney, Agent, or Firm* — Oblon, McClelland, Maier & Neustadt, L.L.P.

(57) ABSTRACT

A painting method and a painting apparatus for a band material that prevent a printing defect during a long-time operation by preventing agglomeration and adhesion of a thixotropic paint in a paint pan is disclosed. The liquid paint is discharged to the paint pan as a jet flow from a level lower than a liquid surface of a paint basin toward a bottom of the paint pan, thereby creating a bottom flow along the bottom
(Continued)

of the paint pan and an upward vortex from the bottom along a side wall of the paint pan. The liquid paint overflows in an amount corresponding to a supplied amount to the paint pan from a front upper edge of the paint pan in a flowing direction of the bottom flow, thereby flowing the liquid paint continuously in the paint pan toward the front upper edge.

1 Claim, 7 Drawing Sheets

(51) Int. Cl.
*B05C 13/02* (2006.01)
*B05C 11/10* (2006.01)
*B05D 7/00* (2006.01)
*B05D 7/24* (2006.01)

(52) U.S. Cl.
CPC .................. *B05D 7/00* (2013.01); *B05D 7/24* (2013.01); *B05D 2252/02* (2013.01)

(58) Field of Classification Search
USPC .......................................... 427/428.19, 428.2
See application file for complete search history.

(56) References Cited

U.S. PATENT DOCUMENTS 3,205,089 A * 9/1965 Kinzelman ............. B05C 5/004 53/140
4,485,132 A * 11/1984 Furuzono .............. B05C 1/0813 427/428.12
6,405,008 B1 * 6/2002 Obu ..................... G03G 15/104 399/237
9,132,444 B2 * 9/2015 Masuo ................. B41J 11/0015
9,289,793 B1 * 3/2016 Bonner ................... B41F 31/04
2004/0101630 A1 * 5/2004 Buecher ................ B05C 1/0834 427/428.15
2012/0113186 A1 * 5/2012 Fukui ................... B41J 11/0015 347/20
2016/0016191 A1 1/2016 Ikeda et al.

FOREIGN PATENT DOCUMENTS

JP 63-248475 A 10/1988
JP 7-96238 A 4/1995
JP 9-131555 A 5/1997
JP 10-403 A 1/1998
JP 11-253875 A 9/1999
JP 2000126660 A * 5/2000
JP 2000262957 A * 9/2000
JP 2003-24850 A 1/2003
JP 2006272125 A * 10/2006
JP 2009-72658 A 4/2009
JP 5072791 B2 4/2010
JP 2010-221139 A 10/2010
JP 2011-62641 A 3/2011
JP 2011-67747 A 4/2011
JP 2012-101439 A 5/2012
JP 2013126655 A * 6/2013
JP 2018-51 482 A 4/2018
WO WO 2014/142000 A1 9/2014

* cited by examiner

PAINTING METHOD AND PAINTING APPARATUS FOR BAND MATERIAL

TECHNICAL FIELD

The present invention relates to a method and apparatus for painting a band material by continuously applying a liquid paint in which resin particles are dispersed in a solvent to the band material.

BACKGROUND ART

One example of an apparatus of this kind is described in a publication of Japanese Patent No. 5072791. In the apparatus described therein, a liquid paint in which resin particles are dispersed in a solvent is held in a paint pan, and the paint is picked up by rotating a pickup roll having its lower half immersed in the liquid paint. An applicator roll is situated higher than the pickup roll while maintaining a slight clearance therebetween so that the paint picked up by the pickup roll is delivered to the applicator roll. A backup roll is situated while maintaining a slight clearance from the applicator roll, and belt-like metallic sheet (i.e., a metal belt) is applied to the backup roll. The metallic sheet is driven at a predetermined speed by rotating the backup roll while being painted or coated with the paint applied from the applicator roll.

A roll coating apparatus having a similar structurer as the apparatus taught by Japanese Patent No. 5072791 is described in Japanese Patent Laid-Open No. H07-96238. In the apparatus described therein, pumps are arranged on each lateral end of a paint pan so that a paint is circulated compulsory in the paint pan from one of the lateral ends toward the other one of the lateral ends, and from the other one of the lateral ends toward said one of the lateral ends.

SUMMARY OF INVENTION

Technical Problem to be Solved by the Invention

In order to ensure a viscosity and a liquidity of a thixotropic paint such as a paint resin, the thixotropic paint has to be agitated or flown at a certain speed thereby dispersing paint particles homogeneously and eliminating a local difference in concentration. If the thixotropic paint is not agitated or flown sufficiently, the paint particles clumping together would adhere to an inner surface of the paint pan, and a membrane would be formed on a liquid surface. Consequently, dispersion of the paint particles would be inhomogeneous, that is, concentration of the thixotropic paint would be inhomogeneous, and this would be a cause of a painting defect. In order to disperse the paint particle homogeneously thereby homogenizing the concentration of the liquid paint, as described in Japanese Patent Laid-Open No. H07-96238, it is effective to always flow the liquid paint by a kinetic energy.

According to the teachings of Japanese Patent Laid-Open No. H07-96238, however, the liquid paint flows in opposite directions from one of lateral ends toward the other one of the lateral ends, and from the other one of the lateral ends toward said one of the lateral ends. Therefore, a velocity of the flow is reduced or a vortex is created between those counter current flows. As a result, the liquid paint would stay stagnant at a center of the vortex or a boundary between those counter current flows (as will be referred to as the "stagnant zone"). In addition, a surface of the liquid paint circulating within the paint pan is continuously exposed to the air and the solvent will be volatilized gradually. As a result, the resin particles would clump together into membranes floating on the surface of the liquid paint circulating within the paint pan. The above-mentioned stagnant zone also exists at many sites other than the center of vortex e.g., at corners of the paint pan, and at a boundary between a bottom and a side wall. In those stagnant zones, the solvent will also be volatilized gradually, and consequently the resin particles will clump together into membranes. Such membranes would grow and eventually levitate to float on the surface of the liquid paint. In addition, the paint particles are gradually isolated from the liquid paint and become deposited on the bottom of the paint pan. Therefore, if the apparatus taught by Japanese Patent Laid-Open No. H07-96238 is operated continuously for a long period of time, a large amount of the paint particles would adhere to the inner wall (and the bottom), and a large amount of the clumped particles would become deposited. Consequently, the concentration of the liquid paint would be changed, and hence a paint film may not be formed homogeneously on the metallic sheet. Further, if the clumped particles adhering to the bottom of the paint pan are separated by the flow of the liquid paint and vibrations of the paint pan, the separated clumped particles would float on the liquid paint and adhere to the metallic sheet. Such particles adhering to the metallic sheet would render the paint film defective.

The present invention has been conceived noting the above-explained technical problems, and it is therefore an object of the present invention to provide a painting method and a painting apparatus for a band material that prevent a printing defect during a long-time operation by preventing agglomeration and adhesion of a thixotropic paint in a paint pan.

Means for Solving the Problem

According to one aspect of the present invention, there is provided a method of painting a band material, comprising: supplying a liquid paint in which resin particles are dispersed or dissolved in a solvent to a paint pan thereby forming a paint basin; applying the liquid paint to an outer circumferential surface of a roll by rotating the roll around a horizontal axis while dipping the roll partially into the paint basin; and applying the liquid paint from the roll to the band material running continuously thereby painting the band material. In order to achieve the above-explained objective, according to the present invention, the painting method comprises: discharging the liquid paint in the form of jet flow from a level lower than a liquid surface of the paint basin toward a bottom of the paint pan, thereby creating a bottom flow of the liquid paint along the bottom of the paint pan and an upward vortex of the liquid paint from the bottom of the paint pan along an inner surface of the paint pan; and causing the liquid paint to overflow in an amount corresponding to a supplied amount to the paint pan from a front upper edge of the paint pan in a flowing direction of the bottom flow, thereby flowing the liquid paint continuously in the paint pan toward the front upper edge.

According to the painting method of the present invention, an outlet to discharge the liquid paint may be situated at a level closer to the bottom of the paint pan than an intermediate level between the liquid surface of the paint basin and the bottom of the paint pan. In addition, the liquid paint may be discharged from the outlet toward the bottom of the paint pan.

According to the painting method of the present invention, the liquid paint may be discharged from the outlet obliquely with respect to the bottom of the paint pan at an angle to create a stream consisting of a vertical component of flow toward the bottom of the paint pan and a horizontal component of flow toward the front upper edge of the paint pan.

According to the painting method of the present invention, a velocity of the bottom flow of the liquid paint along the bottom of the paint pan may be increased faster than a velocity of a surface flow of the paint basin by discharging the liquid paint along the bottom of the paint pan.

According to the present invention, the method of painting the band material may further comprise vibrating the bottom of the paint pan.

According to the painting method of the present invention, the liquid paint may be continuously supplied to the paint pan at a rate to refill the paint pan from 10 to 16 seconds.

According to another aspect of the present invention, there is provided a painting apparatus for a band material, comprising: a paint pan that holds a liquid paint in which resin particles are dispersed or dissolved in a solvent to form a paint basin; and a roll that is rotated around a horizontal axis thereof such that the liquid paint is applied to an outer circumferential surface thereof that is partially dipped into the paint basin. In the painting apparatus, the liquid paint applied to the roll is applied to a surface of the band material running continuously thereby painting the band material. In order to achieve the above-explained objective, according to the present invention, the painting apparatus is provided with: an outlet that discharges the liquid paint in the form of jet flow from a level lower than a liquid surface of the paint basin toward a bottom of the paint pan, thereby creating a bottom flow of the liquid paint along the bottom of the paint pan and an upward vortex of the liquid paint from the bottom of the paint pan along an inner surface of the paint pan; and an overflow weir formed on a front upper edge of the paint pan in a flowing direction of the liquid paint, from which the liquid paint overflows in an amount corresponding to a supplied amount to the paint pan. In the painting apparatus, the outlet and the overflow weir are situated across the roll in the flowing direction of the liquid paint flowing toward the overflow weir.

According to the painting apparatus of the present invention, the outlet may be situated at a level closer to the bottom of the paint pan than an intermediate level between the liquid surface of the paint basin and the bottom of the paint pan.

According to the painting apparatus of the present invention, the outlet may be set to discharge the liquid paint obliquely with respect to the bottom of the paint pan at an angle to create a stream consisting of a vertical component of flow toward the bottom of the paint pan and a horizontal component of flow toward the overflow weir.

According to the painting apparatus of the present invention, the outlet discharges the liquid paint in such a manner as to increase a velocity of the bottom flow faster than a velocity of a surface flow of the paint basin.

According to the present invention, the painting apparatus for the band material may further comprise a vibrating means that vibrates at least the bottom of the paint pan.

According to the painting apparatus of the present invention, the outlet may discharge the liquid paint at a rate to refill the paint pan from 10 to 16 seconds.

Advantageous Effects of Invention

In the painting method and the painting apparatus according to the present invention, the liquid paint in which the resin particles are dispersed or dissolved in the solvent is applied to the surface of the band material. Consequently, the resin particles agglomerate and adhere to the surface of the band material. Eventually, the solvent is vaporized so that the surface of the band material is painted by the resin particles with desired color and pattern. Thus, the resin particles dispersed or dissolved in the solvent will agglomerate with one another and adhere to a metallic surface. According to the present invention, the liquid paint is held in the paint pan, and the roll is partially soaked into the liquid paint. The roll is rotated so that a predetermined amount of the liquid paint is applied to the roll, and further applied to the band material. In the paint pan, the agglomerated resin particles of the liquid paint form a membrane and become deposited gravitationally on the bottom of the paint pan. Consequently, a paint quality would be reduced and a concentration of the liquid paint would become uneven. According to the present invention, such agglomeration and deposition of the resin particles are prevented by applying a hydrodynamic pressure to the liquid paint in the paint pan. Specifically, the liquid paint is supplied to the paint pan by discharging the liquid paint in the form of jet flow thereby creating the bottom flow along the bottom of the paint pan and an upward vortex from the bottom of the paint pan along an inner surface of the paint pan. Eventually, the liquid paint will overflow in an amount corresponding to a supplied amount to the paint pan from the front upper edge of the paint pan in the flowing direction of the liquid paint. Consequently, the liquid paint is flown continuously in the paint pan along the bottom and inner surfaces of the paint pan by the hydrodynamic pressure of the jet flow. For this reason, the agglomeration of the resin particles and the adhesion of the resin particles to the inner surfaces of the paint pan can be prevented. In addition to such agitation in the paint pan, the surface flow of the liquid paint can be created continuously in the paint pan. Specifically, the liquid surface of the liquid paint is raised (or elevated) by the upward vortex so that the liquid paint overflows from the front upper edge of the paint pan in the flowing direction of the liquid paint. Consequently, the surface of the liquid paint is also flown from the rear section toward the front section of the paint pan. For these reasons, the liquid paint is allowed to circulate within the paint pan and to be discharged from the paint pan without being exposed to the air and without remaining stagnant. In addition, not only the agglomeration and deposition of the resin particles but also adhesion of floating agglomerated particles to a paint surface and unevenness of concentration of the liquid paint can be prevented. Therefore, paint quality will not be reduced even if the painting apparatus is operated for a long time.

BRIEF DESCRIPTION OF DRAWINGS

FIG. 6 shows simulation results of flow velocity distribution of the liquid paint in the paint pan according to the second example with respect to different altitudes of an outlet, in which FIG. 6(A) shows a simulation result of a case in which the outlet is situated above the liquid surface, FIG. 6(B) shows a simulation result of a case in which the outlet is situated 25 mm lower than the liquid surface, FIG. 6(C) shows a simulation result of a case in which the outlet is situated 50 mm lower than the liquid surface, and FIG. 6(D) shows a simulation result of a case in which the outlet is situated 75 mm lower than the liquid surface.

DESCRIPTION OF EMBODIMENT(S)

Figure 1:
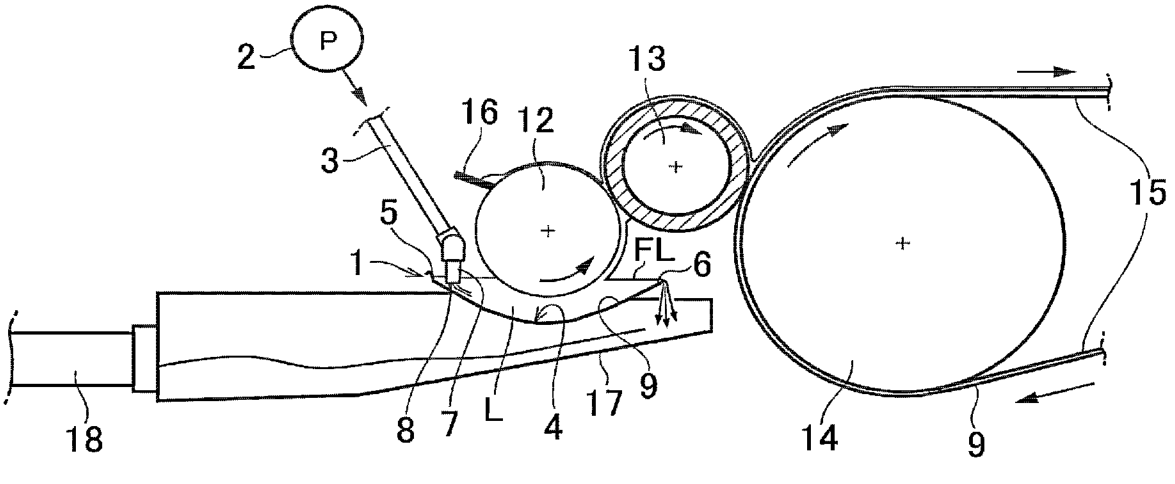
FIG. 1 is a schematic illustration showing one example of the painting apparatus to which the painting method according to the present invention is applied.

Turning now to FIG. 1, there is shown one example of the painting apparatus to which the painting method according to the present invention is applied. As illustrated in FIG. 1, the painting apparatus comprises a paint pan 1 that holds a liquid paint L to form a paint basin, and a pump 2 that supplies the liquid paint L to the paint pan 1. For example, a conventional air driven diaphragm pump or motor driven diaphragm pump may be adopted as the pump 2. A supply pipe 3 is connected to a discharging outlet of the pump 2 so that the liquid paint L discharged from the pump 2 is delivered to the paint pan 1 through the supply pipe 3. A discharging rate of the pump 2 is set to a rate possible to fill the paint pan 1 with the liquid paint L in a predetermined short time.

Figure 2:
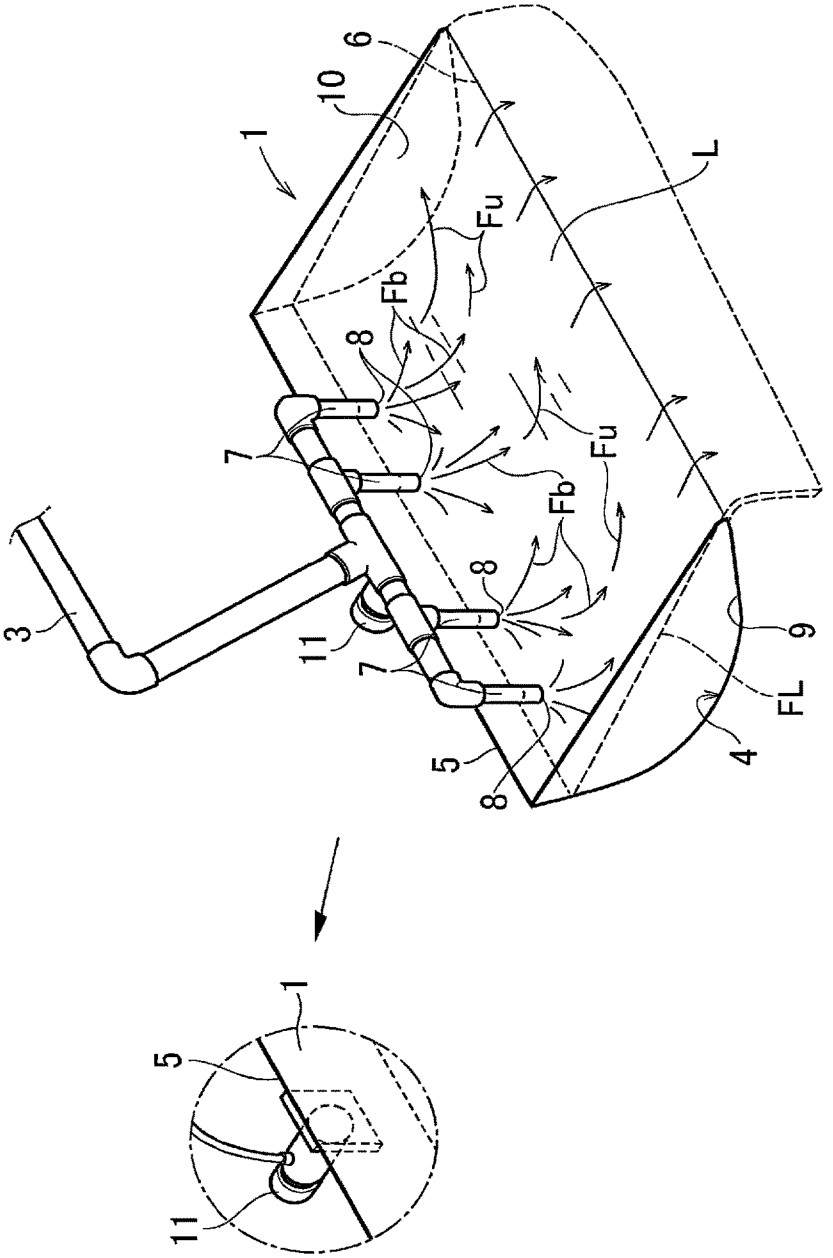
FIG. 2 is a perspective view schematically showing one example of a paint pan.

FIG. 2 is a perspective view schematically showing one example of the paint pan 1. According to the example shown in FIG. 2, the paint pan 1 is shaped into a gutter-like shape having a predetermined depth, and the paint pan 1 is slightly longer than after-mentioned rolls. Specifically, a bottom 4 of the paint pan 1 is curved to protrude downwardly, and the paint pan 1 has a rectangular (oblong) opening on its upper end. The liquid paint L is supplied to the paint pan 1 from the side of an upper edge 5 as a rear longer side of the paint pan 1 in a flowing direction of the liquid paint L, and overflows from another upper edge 6 as a front longer side of the paint pan 1 in the flowing direction of the liquid paint L. That is, another upper edge 6 serves as an overflow weir in the embodiment of the present invention. Accordingly, another upper edge 6 will be referred to as the overflow weir 6 hereinafter.

The liquid paint L is supplied to the paint pan 1 homogeneously as much as possible in the width direction of the paint pan 1 (along the long sides). To this end, a branch pipe 7 having a plurality of outlet pipes 8 is joined to an outlet end of the supply pipe 3 so that the liquid paint L is supplied to the paint pan 1 from the outlet pipes 8. The outlet pipes 8 are attached to the branch pipe 7 at regular intervals in the width direction of the paint pan 1, and outlet ends of the outlet pipes 8 are dipped into the liquid paint L held in the paint pan 1 from above. That is, the outlet ends of the outlet pipes 8 are situated deeper than a liquid surface FL of the liquid paint L. Specifically, the outlet ends of the outlet pipes 8 are situated closer to the bottom 4 of the paint pan 1 than an intermediate level between the liquid surface FL of the liquid paint L and the bottom 4 of the paint pan 1.

An angle of each of the outlet pipes 8 may be adjusted such that the liquid paint L flows perpendicular to the bottom 4 of the paint pan. However, it is preferable to incline the outlet pipes 8 in the following manner. In the example shown in FIGS. 1 and 2, the branch pipe 7 is arranged such that the outlet pipes 8 are oriented downwardly in the vertical direction, and the paint pan 1 is shaped such that the bottom 4 is curved to protrude downwardly. That is, the outlet pipes 8 are inclined such that the liquid paint L discharged therefrom in the form of jet flow is directed obliquely with respect to the bottom 4. In other words, the outlet pipes 8 are inclined with respect to the bottom 4 in such a manner as to create a stream of the liquid paint L consisting of a vertical component of flow toward the bottom 4 and a horizontal component of flow toward the overflow weir 6. Specifically, an inclination angle of the outlet pipes 8 between a tangent line to the bottom 4 opposed to the outlet pipes 8 and center axes of the outlet pipes 8 is an obtuse angle which is wider than a right angle.

In the example shown in FIGS. 1 and 2, the bottom 4 of the paint pan 1 is curved and the outlet pipes 8 are situated above a deepest section (or a lowest section) of the bottom 4. Therefore, the liquid paint L discharged from the outlet pipes 8 flows toward the bottom 4 obliquely downwardly, and further flows toward the overflow weir 6 obliquely upwardly. In the paint pan 1, the liquid paint L flowing toward side walls 9 and 10 of the paint pan 1 is blocked by the side walls 9 and 10, and further flows upwardly along the side walls 9 and 10. According to this example, the flow of the liquid paint L flowing from the outlet pipe 8 to the vicinity of the deepest section of the bottom 4 is referred to as bottom flow Fb. Whereas, the flow of the liquid paint L flowing from the vicinity of the deepest section of the bottom 4 to a section of the bottom 4 where the overflow weir 6 is formed, and the flows of the liquid paint L flowing upwardly along inner surfaces of the side walls 9 and 10 are individually referred to as upward vortex Fu. Adhesion of paint particles (i.e., resin particles) contained in the liquid paint L to the side walls 9 and 10 is prevented by hydrodynamic pressure derived from those flows of the liquid paint L. Even if the resin particles adhere to the side walls 9 and 10, the resin particles are dispersed in the liquid paint L by the hydrodynamic pressure.

Here will be explained a discharge rate of the pump 2. The discharge rate of the pump 2 is adjusted to a value possible to refill the paint pan 1 with the liquid paint L within a predetermined period of time (hereinafter referred to as "refilling time"). In order to prevent adhesion of the resin particles to the bottom 4 and the side walls 9 and 10 of the paint pan 1, and to separate the resin particles easily from the bottom 4 and the side walls 9 and 10 of the paint pan 1, it is necessary to increase a flow velocity and the hydrodynamic pressure of the liquid paint L to a certain extent. Specifically, a hydrodynamic pressure is governed by a flow velocity and a mass of fluid. According to the embodiment of the present invention, therefore, the discharge rate of the liquid paint L from the pump 2 to the paint pan 1, that is, a flow rate of the liquid paint L per unit of time is calculated as a product of a flow velocity and a mass of the liquid paint L. As described, according to the embodiment of the present invention, agglomeration, adhesion, and deposition of the resin particles are prevented by creating the bottom flow Fb and the upward vortex Fu. For this purpose, the bottom flow Fb and the upward vortex Fu may be simulated based on an experimental result. The discharge rate of the pump 2 (i.e., the flow rate of the liquid paint L per unit of time) may be determined based on a capacity of the paint pan 1. Specifically, the discharge rate of the pump 2 (i.e., the flow rate of the liquid paint L per unit of time) is set to a value possible to refill the paint pan 1 in which a pickup roll 12 has not yet been soaked in the liquid paint L in more than 10 seconds but less than 16 seconds.

In order to vibrate (the bottom 4 of) the paint pan 1, an oscillator 11 as a vibrating means is attached to an intermediate section of an outer surface of the upper edge 5 as the rear longer side. Therefore, adhesion and deposition of the resin particles to/on the inner surface of the paint pan 1 can be prevented, and the resin particles adhering to and being deposited on the inner surface of the paint pan 1 can be dispersed effectively in the liquid paint L. For example, a conventional electromagnetic oscillator or a hydraulic oscillator may be adopted as the oscillator 11 to vibrate the paint pan 1. The oscillator 11 may also be attached to any site of an outer surface of the bottom 4 instead of the upper edge 5.

Figure 3:
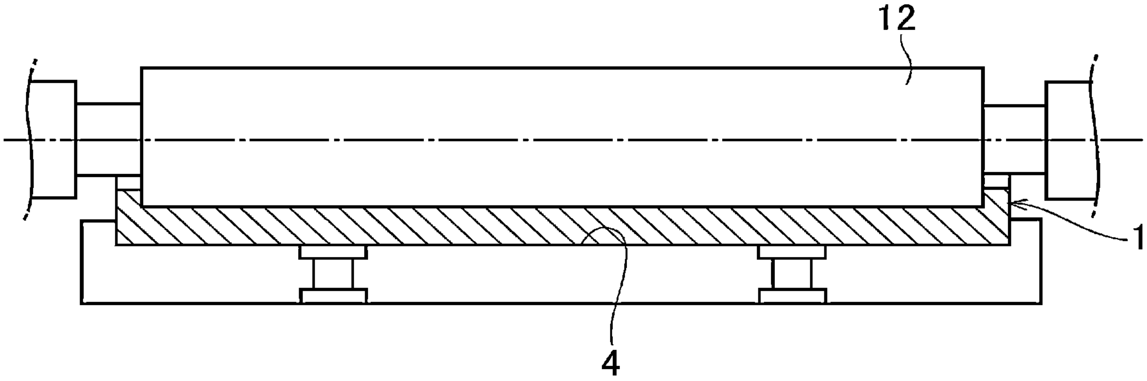
FIG. 3 is a view showing a pickup roll partially soaked in a liquid paint held in a paint pan.

The paint pan 1 is filled with the liquid paint L to serve as a paint basin, and as illustrated in FIG. 3, a lower section of the pickup roll 12 is soaked in the liquid paint L. The outlet pipes 8 are located on one side (i.e., upstream) of the pickup roll 12 in a radial direction of the pickup roll 12 (i.e., in the flowing direction of the liquid paint L toward the overflow weir 6), and the overflow weir 6 is located on the opposite side (i.e., downstream) of the pickup roll 12. In the example shown in FIG. 3, the pickup roll 12 is situated above the deepest section (or the lowest section) of the bottom 4 of the paint pan 1 while being supported such that a rotational center axis thereof (as will be simply referred to as axis hereinafter) extends perpendicular to the flowing direction of the liquid paint L. Therefore, the liquid paint L which is in contact with an outer circumferential surface of the pickup roll 12 is picked up by rotating the pickup roll 12 by a torque of a not shown motor. In order not to hinder the flow of the liquid paint L in the paint pan 1, the outer circumferential surface of the pickup roll 12 is polished to be smoothened. In addition, in order not to hinder the flow of the liquid paint L by the rotation of the pickup roll 12, the pickup roll 12 is rotated in the same direction as the flowing direction of the liquid paint L. For example, since the liquid paint L flows from the left side toward the right side in FIG. 1, the pickup roll 12 is rotated counterclockwise. Accordingly, the pickup roll 12 serves as a roll of the embodiment of the present invention.

Thus, a clearance between the outer circumferential surface of the pickup roll 12 and each clearance between the pickup roll 12 and the side walls 9 and 10 serve as flow paths of the liquid paint L. In this example, a hatched cross-sectional area of the flow path in FIG. 3 between the lowest portion of the pickup roll 12 and the deepest section of the bottom 4 is narrowest in the vertical direction.

As illustrated in FIG. 1, an applicator roll 13 is arranged above the pickup roll 12 so that the liquid paint L is delivered from the pickup roll 12 to the applicator roll 13. The applicator roll 13 is rotated by a not shown motor to apply the liquid paint L received from the pickup roll 12 onto a belt-like metallic sheet (i.e., a metal belt) thereby painting the metallic sheet. To this end, the applicator roll 13 is arranged such that an axis thereof is aligned parallel to the axis of the pickup roll 12 while maintaining a slight clearance between the pickup roll 12 and the applicator roll 13. Specifically, a clearance possible to deliver the liquid paint L is maintained between the pickup roll 12 and the applicator roll 13, and such clearance is determined based on an experimental result. Thus, the liquid paint L is delivered from the pickup roll 12 to the applicator roll 13 through the narrow clearance maintained therebetween. In addition, lengths of the pickup roll 12 and the applicator roll 13 are identical to each other. In order not to apply a shearing force to the liquid paint L between the pickup roll 12 and the applicator roll 13, the applicator roll is rotated in the opposite direction to the rotational direction of the pickup roll 12.

A backup roll 14 is arranged in an opposite side of the pickup roll 12 across the applicator roll 13, and the metallic sheet uncoiled from a not shown coil is applied to the backup roll 14. In the embodiment, a metallic roll in which an outer circumferential surface is made of metal is adopted as the pickup roll 12, a rubber roll in which an outer circumferential surface is covered with butyl rubber whose hardness is 40 is adopted as the applicator roll 13, and a metallic roll in which an outer circumferential surface is made of metal is adopted as the backup roll 14. For example, the metallic sheet 15 is used to manufacture beverage cans and food containers. The metallic sheet 15 is sandwiched between the applicator roll 13 and the backup roll 14 at a desired nip pressure so that the metallic sheet 15 is driven through the clearance between the applicator roll 13 and the backup roll 14 while being painted with the liquid paint L. The backup roll 14 is also arranged such that an axis thereof is aligned parallel with the axes of the pickup roll 12 and the applicator roll 13, and rotated in the same direction as the rotational direction of the applicator roll 13. That is, the backup roll 14 is rotated in the opposite direction to the rotational direction of the pickup roll 12. An amount of the liquid paint L applied to the metallic sheet 15, that is, a thickness of a paint film formed on the metallic sheet 15 may be varied by changing: a clearance between the rolls 12 and 13; a clearance between the rolls 13 and 14; rotational directions of the rolls 12, 13, and 14; each ratio between circumferential velocities of the rolls 12 and 13 with respect to a running speed of the metallic sheet 15; or a nip pressure established by the applicator roll 13 and the backup roll 14. Structures of the rolls 12, 13, and 14 employed in the embodiment of the present invention are similar to those of the painting apparatus described in the publication of Japanese Patent No. 5072791. Therefore, rotational directions of the rolls 12, 13, and 14, each ratio between circumferential velocities with respect to a running speed of the metallic sheet 15, and a nip pressure established by the applicator roll 13 and the backup roll 14 may be set as described in the publication of Japanese Patent No. 5072791.

In order to scrape the liquid paint L from the outer circumferential surface of the pickup roll 12, a scraper 16 is arranged downstream of the site at which the liquid paint L is delivered from the pickup roll 12 to the applicator roll 13 in the rotational direction of the pickup roll 12. Specifically, the scraper 16 is a long and thin plate member, and arranged to be contacted to the outer circumferential surface of the pickup roll 12, or arranged while maintaining a slight clearance from the outer circumferential surface of the pickup roll 12. A length of the scraper 16 is substantially identical to a length of the pickup roll 12. The liquid paint L scraped by the scraper 16 flows along the scraper 16 and the pickup roll 12, and eventually flows down to the paint pan 1 from both ends of the scraper 16 and the pickup roll 12. By thus scraping the liquid paint L from the outer circumferential surface of the pickup roll 12 after delivering the liquid paint L the pickup roll 12 to the applicator roll 13, the outer circumferential surface of the pickup roll 12 is exposed again so that the liquid paint L held in the paint pan 1 is allowed to adhere to the outer circumferential surface of the pickup roll 12.

In order to recover the liquid paint L overflowing from the overflow weir 6, a recovery pan 17 is arranged underneath the paint pan 1 in the height direction of the painting apparatus. As illustrated in FIG. 1, the recovery pan 17 is larger than the paint pan 1 so that the paint pan 1 is situated within the recovery pan 17. That is, the recovery pan 17 overlaps with the paint pan 1 at least partially. In addition, in order to return the collected liquid paint L to the paint pan 1, a bottom of the recovery pan 17 slants mildly toward a predetermined site. Although not shown in the drawings, at least one outlet is formed on a collection site of the liquid paint L, and a recovery conduit 18 is connected to the outlet. In order to discharge the liquid paint L flowing into the recovery pan 17 smoothly from the recovery conduit 18 through the outlet, an opening area of the outlet and a cross-sectional area of the recovery conduit 18 are individually larger than a total area of openings of the outlet pipes 8. In order to prevent adhesion of the resin particles or the agglomeration substance of the resin particles to the recovery pan 17, as the paint pan 1, a not shown oscillator may also be attached to the recovery pan 17 to vibrate the recovery pan 17.

Figure 4:
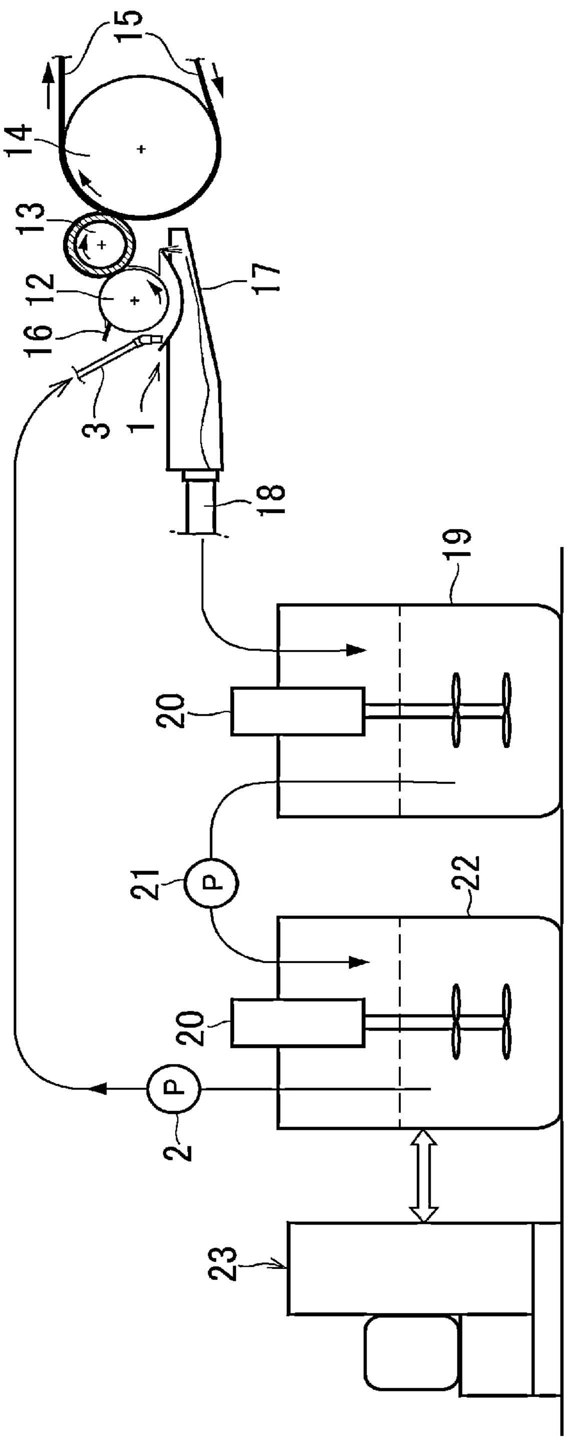
FIG. 4 is a schematic illustration showing one example of a circulation system for returning the collected liquid paint to the paint pan.

Turning to FIG. 4, there is shown one example of a circulation system for returning the collected liquid paint L to the paint pan 1. As illustrated in FIG. 4, the liquid paint L collected by the recovery pan 17 is supplied to a reserve tank 19 through the recovery conduit 18. The recovery pan 17 is adapted only to recover the liquid paint L discharged from the paint pan 1, and hence the recovery pan 17 does not have functions to agitate the liquid paint L and to facilitate the flow of the liquid paint L. Therefore, the recovery conduit 18 is connected to the bottom of the recovery pan 17 to effectively discharge the resin particles being deposited from the bottom of the recovery pan 17. However, if the painting apparatus is operated for several days in a row, the resin particles would agglomerate to become deposited and to float in the liquid paint L. Consequently, viscosity and concentration of the liquid paint L would be changed by such agglomeration of the resin particles. In order to homogenize the viscosity and the concentration of the liquid paint L, the resin particles contained in the collected liquid paint L are dispersed by agitating the liquid paint L. For this purpose, as illustrated in FIG. 4, an agitator 20 is arranged in the reserve tank 19 so that the collected liquid paint L is agitated by the agitator 20.

The liquid paint L agitated in the reserve tank 19 is delivered to a supply tank 22 by a pump 21. For example, the above-mentioned conventional diaphragm pump may also be adopted as the pump 21. The liquid paint L delivered to the supply tank 22 is held in the supply tank 22, and as the reserve tank 19, the agitator 20 is also arranged in the supply tank 22 to facilitate the flow of the liquid paint L held in the supply tank 22. Therefore, the liquid paint L agitated by the agitator 20 to optimize the viscosity thereof is pumped up by the pump 2 and delivered to the paint pan 1 through the supply pipe 3. In addition, since the resin particles contained in the liquid paint L is dispersed by agitating the liquid paint L, the concentration of the liquid paint L is homogenized. In a case that a painting quantity of one lot is small and hence a continuous operating time of the painting apparatus is short, agglomeration of the resin particles in the liquid paint L is small, and adhesion of the resin particles to the inner surface of the paint pan 1 is small. In this case, therefore, the liquid paint L may be supplied directly from the recovery pan 17 to the supply tank 22 through the recovery conduit 18.

In order to adjust viscosity and concentration of the liquid paint L in the supply tank 22 to desired value, the supply tank 22 is connected to an automatic viscosity adjusting device 23. For example, the automatic viscosity adjusting device 23 is provided with a not-shown viscometer and a not shown concentration meter. Therefore, the viscometer and the concentration meter detect viscosity and concentration of the liquid paint L held in the supply tank 22 at predetermined time intervals, and the automatic viscosity adjusting device 23 adjusts amounts of solvent and the resin particles in the supply tank 22 to achieve desired viscosity and concentration of the liquid paint L. Thus, the liquid paint L to be delivered to the paint pan 1 is maintained at constant viscosity and concentration.

Next, here will be explained the painting method using the painting apparatus according to the embodiment of the present invention. The viscosity and the concentration of the liquid paint L held in the supply tank 22 are adjusted to desired values by the automatic viscosity adjusting device 23, and the liquid paint L is delivered from the supply tank 22 to the paint pan 1 through the supply pipe 3 by the pump 2. Since the outlet pipes 8 are attached to the branch pipe 7 at regular intervals in the width direction of the paint pan 1, the liquid paint L is supplied to the paint pan 1 homogeneously in the width direction of the paint pan 1. The liquid paint L is continuously discharged from the outlet pipes 8 to be supplied to the paint pan 1 thereby causing the liquid paint L in the paint pan 1 to overflow from the overflow weir 6, after the liquid paint L is supplied more than a capacity of the paint pan 1. In other words, the liquid paint L overflows from overflow weir 6 in an amount corresponding to a supplied amount to the paint pan 1 after the paint pan 1 is filled with the liquid paint L. Since the outlet ends of the outlet pipes 8 are situated deeper or lower than the liquid surface FL of the liquid paint L held in the paint pan 1, the liquid paint L discharged from the outlet pipes 8 flows along the bottom 4 thereby creating the bottom flow Fb. In this situation, since the liquid paint L discharged from the outlet pipes 8 does not disturb the liquid surface FL of the liquid paint L, the liquid paint L will not splash out of the paint pan 1.

In addition, since the paint pan 1 is vibrated by the oscillator 11, the resin particles and agglomerations thereof will not adhere easily to the inner surface of the paint pan 1, and the resin particles adhering to the inner surface of the paint pan 1 may be separated easily therefrom. Further, the resin particles and agglomerations thereof existing in the vicinity of the inner surface of the paint pan 1 can be agitated effectively by the bottom flow Fb and the upward vortex Fu. Furthermore, in the upper section of the paint pan 1, a height of the liquid paint L is raised (or elevated) by the upward vortex Fu so that the liquid paint L overflows from the overflow weir 6. Consequently, a surface flow of the liquid paint L is created in the upper section of the paint pan 1 from the outlet pipes 8 toward the overflow weir 6. Thus, in the paint basin, the liquid paint L always flows entirely within the paint basin. In addition, the liquid paint L is agitated effectively and the resin particles are flown compulsory at the sites where the resin particles tend to agglomerate and adhere to the inner surface of the paint pan 1. Especially, according to the exemplary embodiment of the present invention, the liquid paint L is supplied to the paint pan 1 at the rate possible to refill the paint pan 1 from approximately 10 to 20 seconds. Therefore, in addition to the bottom flow Fb and the upward vortex Fu, the liquid paint L flows entirely within the paint pan 1 at a velocity of "flow distance Lp1 meter/more than 10 seconds but less than 16 seconds" on average.

For this reason, the liquid paint L and the resin particles dispersed or dissolved therein do not remain stagnant unevenly, and hence it is possible to prevent adhesion, deposition, agglomeration, sedimentation of the resin particles to/on the inner surface of the paint pan 1. As a result, the concentration of the liquid paint L can be homogenized. Here, the liquid paint L overflows in an amount comparable to the supplied amount to the paint pan 1, from the overflow weir 6 that is formed in the opposite side of the outlet pipes 8 across the pickup roll 12. In the reserve tank 19 and the supply tank 22, the concentration of the liquid paint L to be supplied to the paint pan 1 and the dispersion of the resin particles contained therein are adjusted in advance.

Thus, the concentration of the liquid paint L and the dispersion of the resin particles contained therein are homogenized, and the lower section of the pickup roll 12 is soaked in the liquid paint L. Therefore, the liquid paint L in which the concentration thereof and the dispersion of the resin particles contained therein are homogenized is picked up by the outer circumferential surface of the pickup roll 12 by rotating the pickup roll 12. The liquid paint L is delivered from the pickup roll 12 to the applicator roll 13, and applied to the belt-like metallic sheet 15 from the applicator roll 13 thereby painting the metallic sheet 15. Since the concentration of the liquid paint L and the dispersion of the resin particles contained therein are homogenized, the metallic sheet 15 may be painted with the liquid paint L without containing foreign matters such as agglomerated resin particles. That is, it is possible to paint the metallic sheet 15 flawlessly. In addition, since the liquid paint L is flown continuously within the paint pan 1, the resin particles will not adhere to the inner surface of the paint pan 1 and will not become deposited on the bottom of the paint pan 1 even if the painting apparatus is operated continuously for a long period of time. Therefore, the painting apparatus can be operated stably for a long period of time to raise an operation rate of the painting apparatus. In addition, a required man-hour and a cost for maintenance of the painting apparatus can be reduced. Here, the liquid paint L remaining on the outer circumferential surface of the pickup roll 12 without being delivered to the applicator roll 13 is scraped from the outer circumferential surface of the pickup roll 12 by the scraper 16.

Next, here will be explained comparison results between comparative examples 1 to 5 and an example 1 carried out to confirm advantages of the painting method and the painting apparatus according to the present invention.

Example 1

In the Example 1, the metallic sheet 15 was painted by the painting apparatus shown in FIG. 1, and an air driven diaphragm pump was adopted as the pump 2. The liquid paint L was prepared by dispersing polyester resin particles in solvent, and an average diameter of the resin particles was 10 nm to 1000 nm. Specifically, the liquid paint L was thixotropic paint, and according to catalog value released from a maker of the liquid paint L, the liquid paint L contained 25% of dry solid content, viscosity of the liquid paint L was 35 mPa·s, and Ti index was 2.0. Given that the liquid paint L is agitated sufficiently and agitation of the liquid paint L is stopped, the viscosity thereof would increase promptly, and the resin particles would agglomerate due to separation of the resin particles from the solvent. Changes in the viscosity of the liquid paint L with the passage of time are shown in Table 1. Specifically, the viscosity of the liquid paint L was measured at a level 30 mm lower than the liquid surface by a vibration viscometer, and existence of agglomerated particles was visually observed.

TABLE 1

| | 0 min | 1 min | 3 min | 5 min | 10 min |
|---|---|---|---|---|---|
| Viscosity (mPa · s) | 40 | 100 | 112 | 120 | 120 |

At zero minute, the liquid paint L held in a tank was agitated by an agitator (neither of which are shown) at high speed, and the viscosity of the liquid paint L being agitated was measured. As can be seen from Table 1, the viscosity of the liquid paint L at 0 minute was substantially identical to the catalog value. In this situation, since the liquid paint L was agitated at high speed, there were no agglomerated resin particles in the tank.

Then, the agitation speed was changed from the high speed to low speed, and the viscosity of the liquid paint L one minute after reducing the agitation speed to the low speed was 100 mPa·s. In this situation, the resin particles separated from the solvent within one minute after reducing the agitation speed, and resultant agglomerated resin particles became deposited. In addition, the agglomerated resin particles formed a membrane on the surface of the liquid paint L. The viscosity of the liquid paint L was also measured after three minutes, five minutes, and ten minutes from the reduction in the agitation speed to the low speed. As can be seen, the viscosity of the liquid paint L increased with time, and since the liquid paint L was continuously agitated at low speed, the viscosity of the liquid paint L stabilized after five minutes from the reduction in the agitation speed to the low speed.

The liquid paint L having the above-explained property was supplied to the paint pan 1 of the painting apparatus shown in FIG. 1 while changing a discharging rate of the pump 2. In each example, the following items were visually inspected, such as: a disturbance and a raise of the liquid surface FL of the liquid paint L by the upward vortex Fu; a retention or stagnancy of the liquid paint L in the paint pan 1; an existence of the agglomerated resin particles; a change in a thickness of the resin particles adhering to the inner surface of the paint pan 1; and a paint quality on the metallic sheet 15. In the example 1, the outlet ends of the outlet pipes 8 were situated deeper than the liquid surface FL of the liquid paint L, the liquid paint L was supplied to the paint pan 1 at a rate of 160 L/min, one oscillator was attached to the paint pan 1, and the paint pan 1 was refilled with the paint liquid L in 15.17 seconds.

Comparative Example 1

The liquid paint L was supplied to the paint pan 1 at a rate of 80 L/min. Other conditions were identical to those of the Example 1, and above-listed items were also visually inspected. As the Example 1, one oscillator was attached to the paint pan 1, but the paint pan 1 was refilled with the paint liquid L in 30.33 seconds.

Comparative Example 2

The liquid paint L was supplied to the paint pan 1 at a rate of 120 L/min. Other conditions were identical to those of the Example 1, and the above-listed items were also visually inspected. As the Example 1, one oscillator 11 was attached to the paint pan 1, but the paint pan 1 was refilled with the paint liquid L in 20.22 seconds.

Comparative Example 3

The liquid paint L was supplied to the paint pan 1 at a rate of 200 L/min. Other conditions were identical to those of the Example 1, and the above-listed items were also visually inspected. As the Example 1, one oscillator 11 was attached to the paint pan 1, but the paint pan 1 was refilled with the paint liquid L in 12.13 seconds.

Comparative Example 4

The liquid paint L was supplied to the paint pan 1 at a rate of 240 L/min. Other conditions were identical to those of the Example 1, and the above-listed items were also visually inspected. As the Example 1, one oscillator 11 was attached to the paint pan 1, but the paint pan 1 was refilled with the paint liquid L in 10.11 seconds.

Comparative Example 5

The liquid paint L was supplied to the paint pan 1 at a rate of 280 L/min. Other conditions were identical to those of the Example 1, and the above-listed items were also visually inspected. As the Example 1, one oscillator 11 was attached to the paint pan 1, but the paint pan 1 was refilled with the paint liquid L in 8.67 seconds.

(Comprehensive Evaluation)

Evaluation of the example 1 and the comparative examples 1 to 5 is shown in Table 2. In table 2, "Confirmed" indicates that: a disturbance and a raise of the liquid surface FL; a stagnancy of the liquid paint L in the paint pan 1; an existence of the agglomerated resin particles; and an increase in a thickness of the resin particles adhering to the inner surface of the paint pan 1, was visually confirmed. Whereas, "None" indicates that: disturbance and a raise of the liquid surface FL; a stagnancy of the liquid paint L in the paint pan 1; an existence of the agglomerated resin particles; and an increase in a thickness of the resin particles adhering to the inner surface of the paint pan 1, was not confirmed. In addition, in table 2, "○" indicates that an evaluation of the paint quality was good, "x" indicates that an evaluation of the paint quality was unsatisfactory, and "Δ" indicates that an evaluation of the paint quality was between "○" and "x" and less than satisfactory.

6 were not confirmed. This is because the refilling time of the paint pan 1 was longest, that is, a discharging force of the pump 2 (hydrodynamic pressure) was weakest in the Comparative example 1, compared to the Example 1 and the Comparative examples 2 to 5. Therefore, the flow velocity of the liquid paint L was too low and the above-mentioned upward vortex Fu was too weak to disturb and raise the liquid surface FL. That is, in the Comparative example 1, the flow of the liquid paint L discharged from the outlet pipes 8 was too weak to agitate the liquid paint L in the paint pan 1 compared to the Example 1 and the Comparative examples 2 to 5. Consequently, after six hours from the commencement of the Comparative example 1, thicknesses of the resin particles adhering to the bottom 4 and the side walls 9 and 10 of the paint pan 1 increased, the liquid paint L was converted and the agglomerated resin particles flowed on the liquid surface FL in the vicinity of the overflow weir 6, and the paint quality was reduced by the agglomerated resin particles adhering to the metallic sheet 15. For these seasons, the comprehensive evaluation of the Comparative example 1 was "x".

In the Comparative example 2, a disturbance and a raise of the liquid surface FL in the vicinity of the overflow weir 6 were also not confirmed. This is because the discharging force of the pump 2 was also insufficient as in the Comparative example 1. Therefore, the flow velocity of the liquid paint L was too low and the above-mentioned upward vortex Fu was too weak to disturb and raise the liquid surface FL. Nonetheless, although the discharging force of the pump 2 was weak, it was greater than that in the comparative example 1 so that the liquid paint L in the paint pan 1 was agitated compared to the Comparative example 1. Therefore, even after six hours from the commencement of the Comparative example 2, thicknesses of the resin particles adhering to the inner surfaces of the bottom 4 and the side walls 9 and 10 of the paint pan 1 did not increase, and the agglomerated resin particles did not flow on the liquid

TABLE 2

| | Comparative example 1 | Comparative example 2 | Example 1 | Comparative example 3 | Comparative example 4 | Comparative example 5 |
|---|---|---|---|---|---|---|
| Supply rate (L/min) | 80 | 120 | 160 | 200 | 240 | 280 |
| Refilling time (sec) | 30.33 | 20.22 | 15.17 | 12.13 | 10.11 | 8.67 |
| Number of oscillators | 1 | 1 | 1 | 1 | 1 | 1 |
| Disturbance of liquid surface | None | None | Confirmed | Confirmed | Confirmed | Confirmed |
| Stagnancy of paint after 6 hrs | None | None | None | None | None | None |
| Existence of agglomerated particles after 6 hrs | Confirmed | None | None | None | None | None |
| Increase in thickness of particles adhering to inner surface | Confirmed | None | None | None | None | None |
| Paint quality after 2 hrs | ○ | ○ | ○ | ○ | ○ | ○ |
| Paint quality after 4 hrs | ○ | ○ | ○ | ○ | ○ | ○ |
| Paint quality after 6 hrs | Δ | ○ | ○ | ○ | ○ | ○ |
| Comprehensive evaluation | x | ○ | ○ | ○ | Δ | Δ |

As can be seen from Table 2, a stagnancy of the liquid paint L in the paint pan 1 was not confirmed after six hours from the commencement of the experiments in all of the Example 1 and the Comparative examples 1 to 5. This is because the paint pan 1 employed in the Example 1 and the Comparative examples 1 to 5 has a downwardly depressed cross-section as illustrated in FIG. 1. Therefore, the liquid paint L is flown entirely in one direction toward the overflow weir 6 by supplying the liquid paint L from one of the upper edges 5 to the paint pan 1.

In the Comparative example 1, a disturbance and a raise of the liquid surface FL in the vicinity of the overflow weir surface FL in the vicinity of the overflow weir 6. In addition, the paint quality of the metallic sheet 15 was good. For these seasons, the comprehensive evaluation of the Comparative example 2 was "○".

In the Example 1, a disturbance and a raise of the liquid surface FL were confirmed in the vicinity of the overflow weir 6. That is, since the discharging force of the pump 2 was sufficient to increase the flow velocity of the liquid paint L, the upward vortex Fu was created sufficiently so that the liquid paint L in the paint pan 1 was agitated sufficiently compared to the Comparative examples 1 and 2. Therefore, even after six hours from the commencement of the Example 1, thicknesses of the resin particles adhering to the inner surfaces of the bottom 4 and the side walls 9 and 10 of the paint pan 1 did not increase, and the agglomerated resin particles did not flow on the liquid surface FL in the vicinity of the overflow weir 6. Accordingly, the paint quality of the metallic sheet 15 was also good. For these seasons, the comprehensive evaluation of the Example 1 was "○".

The results of each item in the Comparative example 3 were same as those of the Example 1. Therefore, the paint quality of the metallic sheet 15 was also good, and the comprehensive evaluation of the Comparative example 3 was also "○".

The results of each item in the Comparative example 4 were same as those of the Example 1 and the Comparative example 3. However, since the discharging force of the pump 2 was increased compared to that in the Comparative example 3, a collision impact of the liquid paint L discharged from the outlet pipes 8 against the bottom 4 of the paint pan 1 was too great. Consequently, the liquid paint L in the paint pan 1 was splashed out of the paint pan 1. In addition, the momentum of the liquid paint L overflowing from the overflow weir 6 into the recovery pan 17 was too great, and consequently the liquid paint L in the recovery pan 17 was splashed out of the recovery pan 17. For these seasons, although the paint quality of the metallic sheet 15 was good, the comprehensive evaluation of the Comparative example 4 was "Δ".

The results of each item in the Comparative example 5 were same as those of the Example 1 and the Comparative example 4. However, the collision impact of the liquid paint L discharged from the outlet pipes 8 against the bottom 4 of the paint pan 1 was greater than that in the Comparative example 4 and hence the liquid paint L in the paint pan 1 was splashed out of the paint pan 1 more intensively. In addition, the momentum of the liquid paint L overflowing from the overflow weir 6 into the recovery pan 17 was greater, and consequently the liquid paint L in the recovery pan 17 was splashed out of the recovery pan 17 more intensively. In the Comparative example 5, although the paint quality of the metallic sheet 15 was good, the liquid paint L was supplied excessively to the paint pan 1. For these seasons, the comprehensive evaluation of the Comparative example 5 was "x".

Next, here will be explained comparison results between comparative examples 6 to 12 and an example 2 carried out to confirm advantages of the painting method and the painting apparatus according to the present invention. In the Example 2, a paint pan having a box shape was adopted as the paint pan 1.

Example 2

Figure 5:
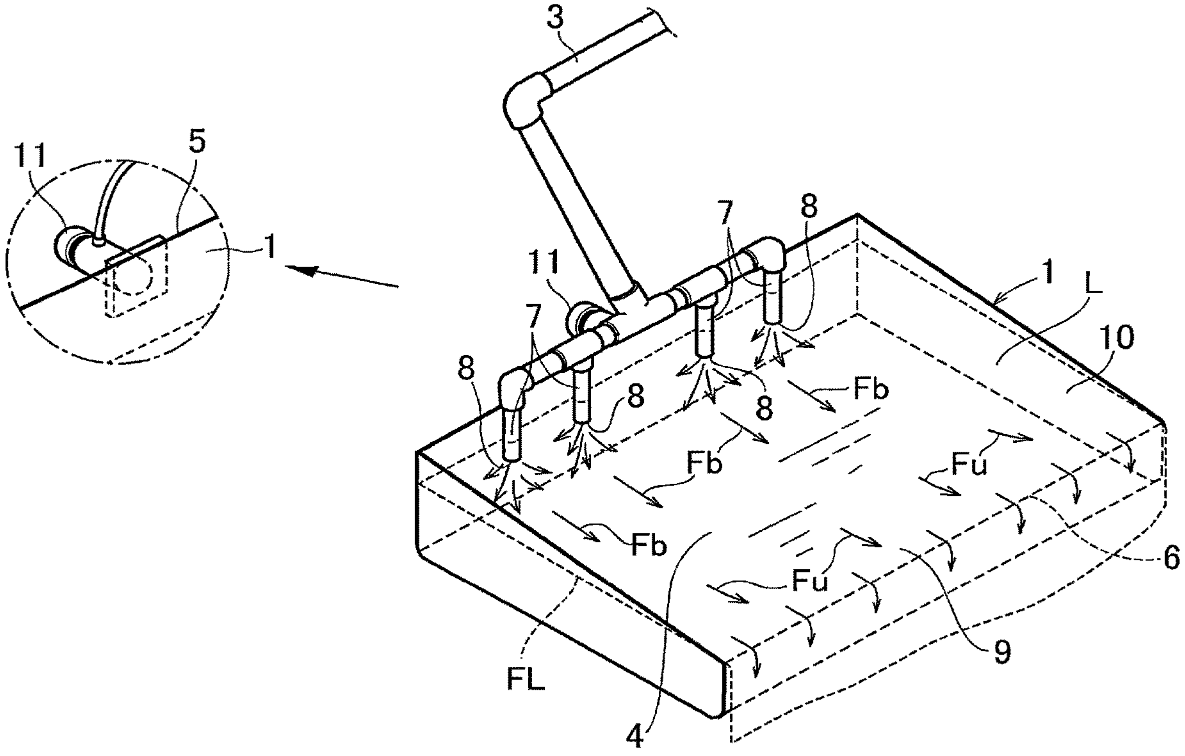
FIG. 5 is a perspective view showing the paint pan according to a second example.

The paint pan 1 employed in the Example 2 is schematically shown in FIG. 5. In the example shown in FIG. 5, the paint pan 1 is shaped into a truncated box shape having a rectangular cross-section. As the Example 1, the branch pipe 7 is joined to the supply pipe 3, and the outlet pipes 8 are attached to the branch pipe 7 above the bottom 4 at regular intervals in the width direction of the paint pan 1 along the upper edge 5. In the second Example, specifically, the outlet ends of the outlet pipes 8 are also situated closer to the bottom 4 of the paint pan 1 than an intermediate level between the liquid surface FL of the liquid paint L and the bottom 4 of the paint pan 1. In the example 2, the liquid paint L was supplied to the paint pan 1 at a rate of 320 L/min, one oscillator was attached to the paint pan 1, and the paint pan 1 was refilled with the paint liquid L in 13.64 seconds.

Comparative Example 6

The liquid paint L was supplied to the paint pan 1 at a rate of 200 L/min. Other conditions were identical to those of the Example 2, and the above-mentioned items were also visually inspected. As the Example 2, one oscillator 11 was attached to the paint pan 1, but the paint pan 1 was refilled with the paint liquid L in 21.83 seconds.

Comparative Example 7

The liquid paint L was supplied to the paint pan 1 at a rate of 240 L/min. Other conditions were identical to those of the Example 2, and the above-mentioned items were also visually inspected. As the Example 2, one oscillator 11 was attached to the paint pan 1, but the paint pan 1 was refilled with the paint liquid L in 18.19 seconds.

Comparative Example 8

The liquid paint L was supplied to the paint pan 1 at a rate of 280 L/min. Other conditions were identical to those of the Example 2, and the above-mentioned items were also visually inspected. As the Example 2, one oscillator 11 was attached to the paint pan 1, but the paint pan 1 was refilled with the paint liquid L in 15.59 seconds.

Comparative Example 9

The liquid paint L was supplied to the paint pan 1 at a rate of 360 L/min. Other conditions were identical to those of the Example 2, and the above-mentioned items were also visually inspected. As the Example 2, one oscillator 11 was attached to the paint pan 1, but the paint pan 1 was refilled with the paint liquid L in 12.13 seconds.

Comparative Example 10

The liquid paint L was supplied to the paint pan 1 at a rate of 400 L/min. Other conditions were identical to those of the Example 2, and the above-mentioned items were also visually inspected. As the Example 2, one oscillator 11 was attached to the paint pan 1, but the paint pan 1 was refilled with the paint liquid L in 10.91 seconds.

Comparative Example 11

The liquid paint L was supplied to the paint pan 1 at a rate of 440 L/min. Other conditions were identical to those of the Example 2, and the above-mentioned items were also visually inspected. As the Example 2, one oscillator 11 was attached to the paint pan 1, but the paint pan 1 was refilled with the paint liquid L in 9.92 seconds.

Comparative Example 12

In the Comparative example 12, the oscillator 11 was detached from the paint pan 1. Other conditions were identical to those of the Example 2, and the above-mentioned items were also visually inspected.

(Comprehensive Evaluation)

Evaluation of the example 2 and the comparative examples 6 to 12 is shown in Table 3. In table 3, "Confirmed" indicates that: a disturbance and a raise of the liquid surface FL; a stagnancy of the liquid paint L in the paint pan 1; an existence of the agglomerated resin particles; and an increase in a thickness of the resin particles adhering to the inner surface of the paint pan 1, was visually confirmed. Whereas, "None" indicates that: disturbance and a raise of the liquid surface FL; a stagnancy of the liquid paint L in the paint pan 1; an existence of the agglomerated resin particles; and an increase in a thickness of the resin particles adhering to the inner surface of the paint pan 1, was not confirmed. In addition, in table 3, "○" indicates that an evaluation of the paint quality was good, "x" indicates that an evaluation of the paint quality was unsatisfactory, and "Δ" indicates that an evaluation of the paint quality was between "○" and "x" and less than satisfactory.

In the Comparative example 7, a disturbance and a raise of the liquid surface FL were also not confirmed in the vicinity of the overflow weir 6. This is because the discharging force of the pump 2 was also insufficient as in the Comparative example 6. Therefore, the upward vortex Fu was too weak to disturb and raise the liquid surface FL. In the Comparative example 7, a stagnancy of the liquid paint L in the paint pan 1 was not confirmed even after six hours from the commencement of the Comparative example 7. However, since the discharging force of the pump 2 was too weak to agitate the liquid paint L sufficiently in the paint pan 1, the liquid paint L was converted and agglomerated, and thicknesses of the resin particles adhering to the bottom 4 and the side walls 9 and 10 of the paint pan 1 increased after six hours from the commencement of the Comparative example 7. Consequently, the paint quality was reduced by the agglomerated resin particles adhering to the metallic sheet 15 after six hours from the commencement of the Comparative example 7. For these seasons, the comprehensive evaluation of the Comparative example was "Δ".

TABLE 3

| | Comparative example 6 | Comparative example 7 | Comparative example 8 | Example 2 | Comparative example 9 | Comparative example 10 | Comparative example 11 | Comparative example 12 |
|---|---|---|---|---|---|---|---|---|
| Supply rate (L/min) | 200 | 240 | 280 | 320 | 360 | 400 | 440 | 320 |
| Refilling time (sec) | 21.83 | 18.19 | 15.59 | 13.64 | 12.13 | 10.91 | 9.92 | 13.64 |
| Number of oscillators | 1 | 1 | 1 | 1 | 1 | 1 | 1 | 0 |
| Disturbance of liquid surface | None | None | Confirmed | Confirme | Confirmed | Confirmed | Confirmed | Confirmed |
| Stagnancy of paint after 6 hrs | Confirmed | None | None | None | None | None | None | None |
| Existence of agglomerated particles after 6 hrs | Confirmed | Confirmed | None | None | None | None | None | None |
| Increase in thickness of particles adhering to inner surface | Confirmed | Confirmed | None | None | None | None | None | Confirmed |
| Paint quality after 2 hrs | ○ | ○ | ○ | ○ | ○ | ○ | ○ | ○ |
| Paint quality after 4 hrs | Δ | ○ | ○ | ○ | ○ | ○ | ○ | x |
| Paint quality after 6 hrs | x | Δ | ○ | ○ | ○ | ○ | ○ | x |
| Comprehensive evaluation | x | Δ | ○ | ○ | ○ | Δ | x | x |

In the Example 2, a disturbance and a raise of the liquid surface FL were confirmed in the vicinity of the overflow weir 6. That is, the upward vortex Fu was created sufficiently by the discharging force (hydrodynamic pressure) of the pump 2 so that the liquid paint L in the paint pan 1 was agitated sufficiently. Therefore, even after six hours from the commencement of the Example 2, thicknesses of the resin particles adhering to the inner surfaces of the bottom 4 and the side walls 9 and 10 of the paint pan 1 did not increase, and the agglomerated resin particles did not flow on the liquid surface FL in the vicinity of the overflow weir 6. Accordingly, the paint quality of the metallic sheet 15 was also good. For these seasons, the comprehensive evaluation of the Example 2 was "○".

In the Comparative example 6, a disturbance and a raise of the liquid surface FL were not confirmed in the vicinity of the overflow weir 6. This is because the refilling time of the paint pan 1 was longest, that is, the discharging force of the pump 2 was weakest in the Comparative example 6, compared to the Example 2 and the Comparative examples 7 to 12. Therefore, the upward vortex Fu was too weak to disturb and raise the liquid surface FL. That is, in the Comparative example 6, the flow of the liquid paint L discharged from the outlet pipes 8 was too weak to agitate the liquid paint L in the paint pan 1. Consequently, after six hours from the commencement of the Comparative example 6, thicknesses of the resin particles adhering to the bottom 4 and the side walls 9 and 10 of the paint pan 1 increased, the liquid paint L was converted and agglomerated, and the paint quality was reduced by the agglomerated resin particles adhering to the metallic sheet 15. For these seasons, the comprehensive evaluation of the Comparative example 6 was "x".

In the Comparative example 8, a disturbance and a raise of the liquid surface FL were confirmed in the vicinity of the overflow weir 6 as in the Example 2. That is, since the upward vortex Fu was created sufficiently by the discharging force of the pump 2, the liquid paint L in the paint pan 1 was agitated sufficiently. Therefore, even after six hours from the commencement of the Comparative example 8, a stagnancy of the liquid paint L in the paint pan 1 was not confirmed. In addition, thicknesses of the resin particles adhering to the inner surfaces of the bottom 4 and the side walls 9 and 10 of the paint pan 1 did not increase, and the agglomerated resin particles did not flow on the liquid surface FL in the vicinity of the overflow weir 6. Accordingly, the paint quality of the metallic sheet 15 was not reduced by the adherence of the agglomerated resin particles. For these seasons, the comprehensive evaluation of the Comparative example 8 was "○".

The results of each item in the Comparative example 9 were same as those of the Example 2. Therefore, the paint quality of the metallic sheet 15 was also good, and the comprehensive evaluation of the Comparative example 9 was also "○".

The results of each item in the Comparative example 10 were same as those of the Example 2 and the Comparative example 9. However, since the discharging force of the pump 2 was increased compared to that in the Comparative example 9, a collision impact of the liquid paint L discharged from the outlet pipes 8 against the bottom 4 of the paint pan 1 was too great. Consequently, the liquid paint L in the paint pan 1 was splashed out of the paint pan 1. In addition, the momentum of the liquid paint L overflowing from the overflow weir 6 into the recovery pan 17 was too great, and consequently the liquid paint L in the recovery pan 17 was splashed out of the recovery pan 17. For these seasons, although the paint quality of the metallic sheet 15 was good, the comprehensive evaluation of the Comparative example 10 was Δ.

The results of each item in the Comparative example 11 were same as those of the Example 2 and the Comparative examples 9 and 10. However, the collision impact of the liquid paint L discharged from the outlet pipes 8 against the bottom 4 of the paint pan 1 was greater than that in the Comparative example 10 and hence the liquid paint L in the paint pan 1 was splashed out of the paint pan 1 more intensively. In addition, the momentum of the liquid paint L overflowing from the overflow weir 6 into the recovery pan 17 was greater, and consequently the liquid paint L in the recovery pan 17 was splashed out of the recovery pan 17 more intensively. In the Comparative example 11, although the paint quality of the metallic sheet 15 was good, the liquid paint L was supplied excessively to the paint pan 1. For these seasons, the comprehensive evaluation of the Comparative example 11 was "x".

In the Comparative example 12, a disturbance and a raise of the liquid surface FL were confirmed in the vicinity of the overflow weir 6. However, since the oscillator 11 was omitted, thicknesses of the resin particles adhering to the bottom 4 and the side walls 9 and 10 of the paint pan 1 increased after six hours from the commencement of the Comparative example 12. In addition, the paint quality was reduced by the agglomerated resin particles adhering to the metallic sheet 15 after four hours from the commencement of the Comparative example 12. For these seasons, the comprehensive evaluation of the Comparative example 12 was "x".

Those experimental results show that the bottom flow Fb and the upward vortex Fu are weakened with a reduction in the discharging force of the pump 2, and the agitation of the liquid paint L in the paint pan 1 is thereby damped. As a result, separation of the resin particles from the liquid paint L is expedited over time, and the resin particles agglomerate especially at the sites where the liquid paint L stays stagnant, e.g., in the vicinity of the bottom 4 and the side walls 9 and 10 of the paint pan 1. The resultant agglomerated resin particles and the liquid paint L whose viscosity has been increased would remain in the paint pan 1. In this situation, only the clear upper section of the liquid paint L in the paint pan 1 would be replaced with the new liquid paint L. That is, only the liquid surface FL of the liquid paint L is flown in the paint pan 1. As described, the liquid paint L in the paint pan 1 may be agitated sufficiently to create the bottom flow Fb and the upward vortex Fu sufficiently by adjusting the discharging force of the pump 2 in such a manner as to refill the paint pan 1 with the liquid paint L in 10 to 16 seconds. In this case, the liquid paint L is flown continuously and entirely in the paint pan 1 without staying stagnant. For this reason, conversion of the liquid paint L and agglomeration of the resin particles can be prevented. According to the present invention, therefore, the painting apparatus to which the painting method is applied can be operated in a stable manner for a long time, and the paint quality of the metallic sheet 15 can be maintained for a long time. In addition, it is possible to decrease the frequency of maintenance of the painting apparatus.

Figure 6:
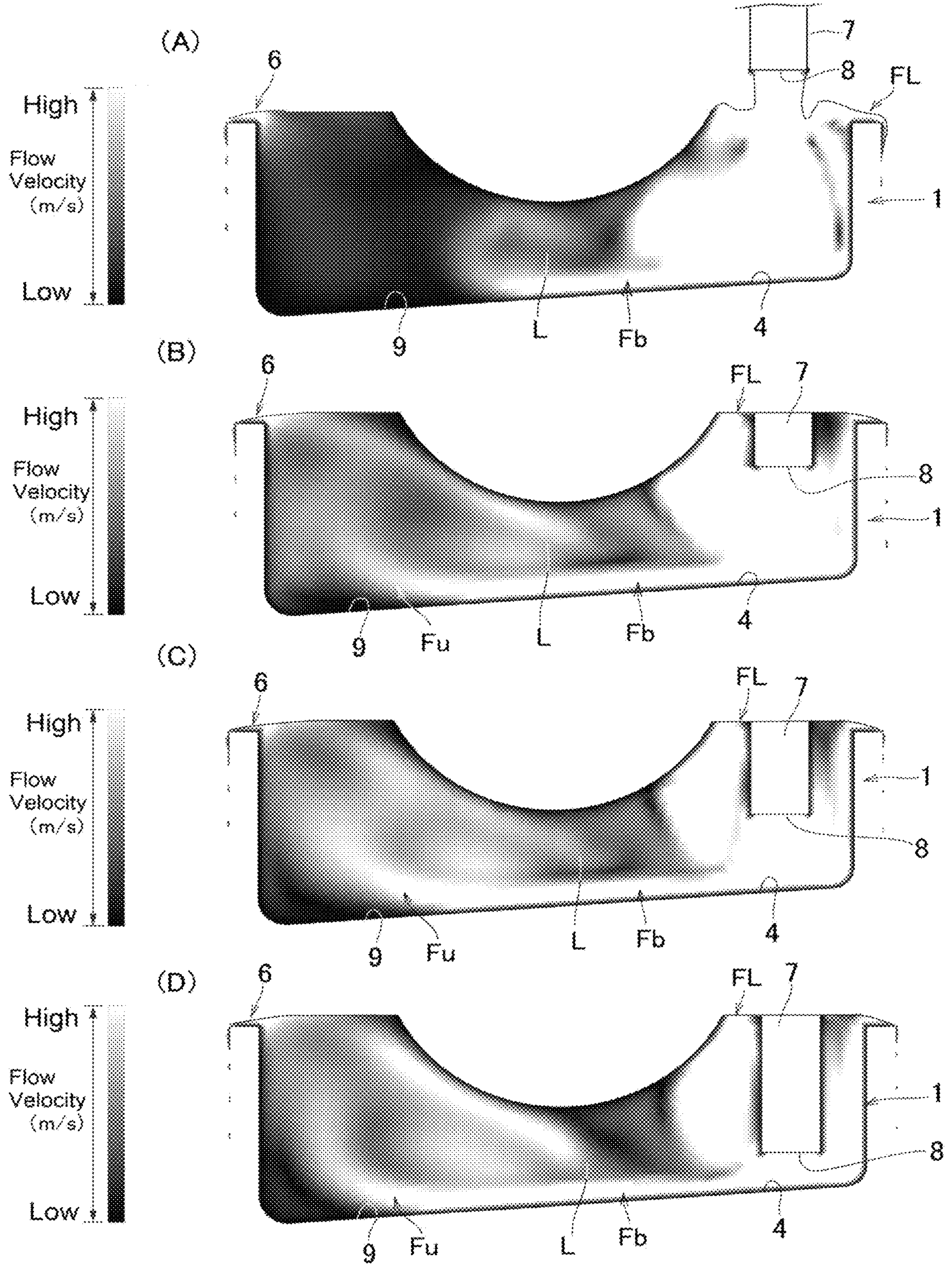

Here will be explained a change of a current of the liquid paint L in the paint pan 1 with respect to a position of the outlet pipes 8. Turning to FIG. 6, there are shown pictures showing simulation results of flow velocity distribution of the liquid paint L in the paint pan 1 with respect to different altitude of the outlet pipes 8. In FIG. 6(A), the outlet ends of the outlet pipes 8 are situated above the liquid surface FL. In FIG. 6(B), the outlet ends of the outlet pipes 8 are situated 25 mm lower than the liquid surface FL. In FIG. 6(C), the outlet ends of the outlet pipes 8 are situated 50 mm lower than the liquid surface FL. In FIG. 6(D), the outlet ends of the outlet pipes 8 are situated 75 mm lower than the liquid surface FL.

In the case shown in FIG. 6(A), the outlet ends of the outlet pipes 8 are situated above the liquid surface FL. In this case, the liquid paint L discharged from the outlet pipes 8 strikes the liquid surface FL while splashing. In addition, a kinetic energy of the liquid paint L discharged from the outlet pipes 8 will be damped when colliding against the liquid surface FL of the liquid paint L in the paint pan 1. The kinetic energy of the liquid paint L discharged from the outlet pipes 8 will be further damped by a viscosity resistance of the liquid paint L in the paint pan 1. For these reasons, although the bottom flow Fb is created in the paint pan 1 along the bottom 4 by the liquid paint L colliding with the bottom 4 as depicted in FIG. 6(A), the bottom flow Fb does not flow all over the bottom 4 to the overflow weir 6. In this case, therefore, the upward vortex Fu will not be created by the bottom flow Fb.

In the case shown in FIG. 6(B) in which the outlet ends of the outlet pipes 8 are situated 25 mm lower than the liquid surface FL, the liquid paint L discharged from the outlet pipes 8 will not collide with the liquid surface FL. Therefore, the kinetic energy of the liquid paint L flowing into the paint pan 1 will not be damped so that the bottom flow Fb is created by the liquid paint L colliding with the bottom 4. In this case, a velocity of the bottom flow Fb is higher than that of the case shown in FIG. 6(A), and the bottom flow Fb collides with the inner surface of the overflow weir 6 at a high speed thereby creating the upward vortex Fu toward the overflow weir 6. As a result, the liquid paint L in the paint pan 1 is agitated sufficiently by the bottom flow Fb and the upward vortex Fu. As depicted in FIGS. 6(C) and 6(D), velocities of the bottom flow Fb and the upward vortex Fu are increased by lowering the outlet ends of the outlet pipes 8. That is, the liquid paint L discharged from the outlet pipes 8 is allowed to flow without being subjected to the viscosity resistance of the liquid paint L in the paint pan 1, and hence the liquid paint L discharged from the outlet pipes 8 collides with the bottom 4 while keeping the kinetic energy thereof. Thus, it is preferable to situate the outlet ends of the outlet pipes 8 below the liquid surface FL. More specifically, it is preferable to situate the outlet ends of the outlet pipes 8 at an intermediate level between the liquid surface FL and the bottom 4 or deeper. Consequently, the velocities of the bottom flow Fb and the upward vortex Fu are increased thereby agitating the liquid paint L sufficiently and entirely in the paint pan 1. In addition, in order to allow the liquid paint L discharged from the outlet pipes 8 effectively along the bottom 4, it is more preferable to set an angle between the outlet ends of the outlet pipes 8 and the bottom 4 to an obtuse angle.

Figure 7:
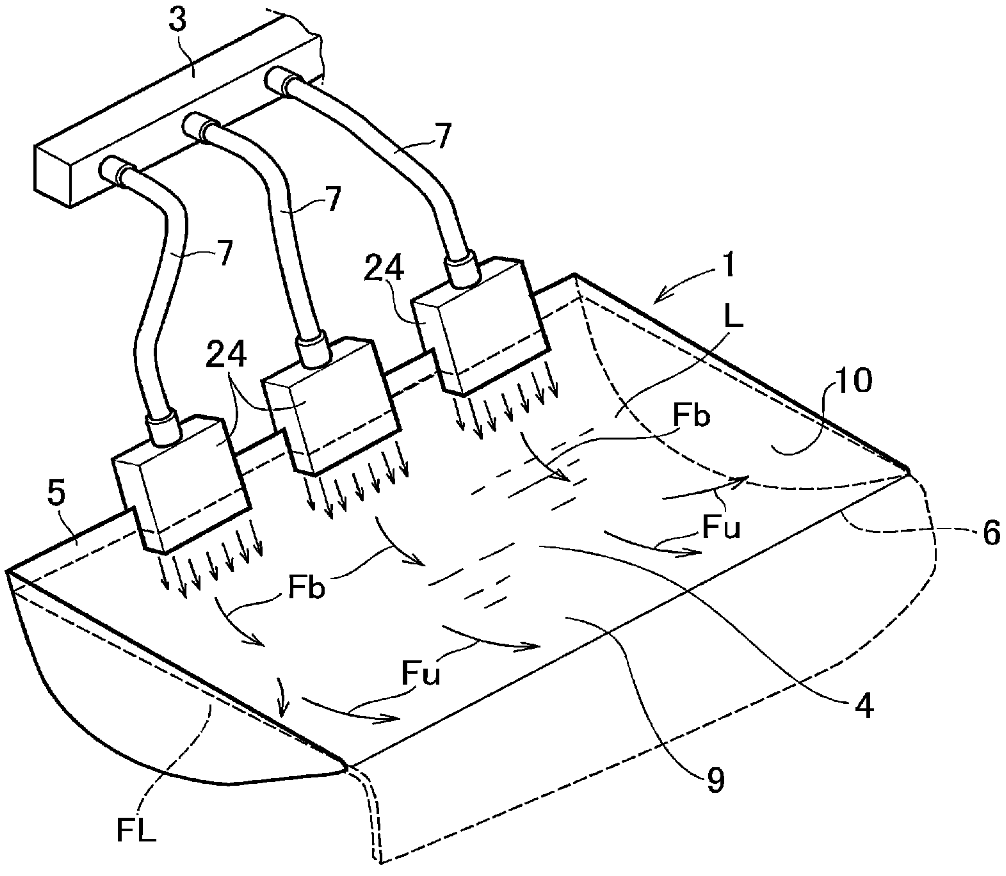
FIG. 7 is a perspective view showing an example in which a nozzle is attached to the outlet.

The present invention should not be limited to the foregoing examples. For example, as illustrated in FIG. 7, nozzles 24 may also be attached to leading ends of the branch pipes 7. Specifically, the nozzles 24 are attached to the branch pipes 7 at regular intervals in the width direction of the paint pan 1 along the upper edge 5, and outlet ends of the nozzles 24 are situated deeper than the liquid surface FL of the liquid paint L held in the paint pan 1. The remaining structures of the painting apparatus shown in FIG. 7 are identical to those of the painting apparatus shown in FIG. 1. Therefore, common reference numerals are assigned to the common elements, and detailed explanations for the common elements are omitted.

In the example shown in FIG. 7, the liquid paint L discharged from the nozzles 24 flows entirely and constantly in the length direction of the paint pan 1. In addition, since the liquid paint L is sprayed from the nozzles 24, the velocity of the liquid paint L can be further increased so that the velocities of the bottom flow Fb and the upward vortex Fu are further increased. According to the example shown in FIG. 7, therefore, the advantages of the foregoing examples may also be achieved. Furthermore, according to the present invention, additional nozzles may be arranged in the liquid paint L held in the paint pan 1 to increase the velocity of the bottom flow Fb higher than a velocity of a surface flow of the liquid paint L.

The invention claimed is:

1. A method of painting a band material, comprising:

supplying a liquid paint in which resin particles are dispersed or dissolved in a solvent to a paint pan thereby forming a paint basin;

applying the liquid paint to an outer circumferential surface of a roll by rotating the roll around a horizontal axis while dipping the roll partially into the paint basin;

applying the liquid paint from the roll to the band material running continuously via an applicator roll thereby painting the band material, discharging the liquid paint in the form of jet flow from a plurality of outlets arranged along one of long sides of a rectangular upper opening of the paint pan at regular intervals and at a level lower than a liquid surface of the paint basin toward a bottom of the paint pan, at a rate to refill the paint pan from 10 to 16 seconds, thereby creating a bottom flow of the liquid paint along the bottom of the paint pan and an upward vortex from the bottom of the paint pan along an inner surface of the paint pan;

vibrating at least the bottom of the paint pan; and causing the liquid paint to overflow from an overflow weir formed entirely on the other one of the long sides of the rectangular upper opening of the paint pan, thereby creating a surface flow of the liquid paint entirely along the liquid surface of the paint basin in an upper section of the paint pan toward the overflow weir, wherein the bottom flow is created such that the liquid paint flows obliquely upwardly toward the overflow weir at least on an overflow weir side of the paint pan, wherein the axis extends perpendicular to a flowing direction of the surface flow, and the roll is rotated such that the outer circumferential surface of the roll moves in the paint basin in a same direction as the flowing direction of the surface flow, wherein the plurality of outlets are situated at a level closer to the bottom of the paint pan than an intermediate level between the liquid surface of the paint basin and the bottom of the paint pan, wherein the liquid paint is discharged from the plurality of outlets obliquely with respect to the bottom of the paint pan at an obtuse angle to create a stream consisting of a vertical component of flow toward the bottom of the paint pan and a horizontal component of flow toward the other one of the long sides of the rectangular upper opening of the paint pan, and wherein a scraper is arranged downstream of a location at which the liquid paint is applied from the roll to the applicator roll in a rotational direction of the roll, a length of the scraper being substantially equal to a length of the roll wherein a recovery pan is arranged underneath the paint pan so as to collect the liquid paint overflowing from the overflow weir, the recovery pan being larger than the paint pan so that the paint pan is situated within the recovery pan, a bottom of the recovery pan being inclined toward a predetermined location, and the recovery pan being connected to a recovery conduit having a cross sectional area greater than a total area of the plurality of outlets.

* * * * *